United States Patent [19]

Aiba et al.

[11] 3,929,666

[45] Dec. 30, 1975

[54] PROCESS FOR PREPARING BASIC ALUMINUM SALT SOLUTION

[75] Inventors: Yoshikazu Aiba; Takaki Furumori; Shozo Shinpo; Kaoru Funabiki, all of Kakogawa, Japan

[73] Assignee: Taki Fertilizer Manufacturing Co., Ltd., Japan

[22] Filed: Apr. 2, 1974

[21] Appl. No.: 457,344

[30] Foreign Application Priority Data

Apr. 19, 1973 Japan.............................. 48-44475

[52] U.S. Cl. ................ 252/317; 210/42; 252/175; 423/397; 423/467; 423/556; 423/629
[51] Int. Cl.² ..... C02B 1/20; C01F 7/74; C01F 7/76
[58] Field of Search .......... 423/462, 467, 544, 556, 423/625, 629, 631, 395, 397; 210/47, 53, 42; 252/175, 317

[56] References Cited

UNITED STATES PATENTS

| | | | |
|---|---|---|---|
| 3,497,459 | 2/1970 | Nakamura et al. ................. | 252/175 |
| 3,544,476 | 12/1970 | Aiba et al. ........................... | 423/556 |

FOREIGN PATENTS OR APPLICATIONS

| | | | |
|---|---|---|---|
| 45-49 | 1/1970 | Japan................................. | 423/556 |

OTHER PUBLICATIONS

*Hackh's Chemical Dictionary* Third Edition 1953 Blakiston Company New York, New York pp. 297 & 31.

*Primary Examiner*—Oscar R. Vertiz
*Assistant Examiner*—Gary P. Straub
*Attorney, Agent, or Firm*—Wenderoth, Lind & Ponack

[57] ABSTRACT

The present invention relates to a process for preparing a stable solution of a basic aluminum salt represented by the formula:

$$Al_m(OH)_nX_{3m-n-2k}(SO_4)_k$$

wherein X denotes $Cl^-$ or $NO_3^-$, $k$, $m$ and $n$ are respective positive indices, $3m > n + 2k$, the basicity $((n/3m) \times 100)$ is 30 to 70% and $k/m = 0.01$ to 0.3, characterized by mixing a water-soluble sulfate or a solution containing $SO_4$, a solution containing $Al^{+++}$ and $X^-$ and a sodium or potassium aluminate solution at a temperature below 40°C so as to form a gel and then keeping the entire mixture at 50° to 80°C so that the gel is dissolved to give a basic aluminum salt solution.

11 Claims, No Drawings

PROCESS FOR PREPARING BASIC ALUMINUM SALT SOLUTION

This invention relates to a process for preparing a stable basic aluminum salt solution.

Basic aluminum salt solutions have come to be used extensively for treating effluent water, ground water and sewage as excellent water treating agents replacing aluminum sulfate which is a conventional coagulant for treating water. Among them, a basic aluminum chloride salt solution containing a proper amount of sulfuric acid root shows an excellent water-clarifying effect in wide pH and temperature ranges and is quickly increasing in its demand.

There are known methods of preparing basic aluminum salt solutions:

A. wherein metallic aluminum is decomposed with hydrochloric acid less than an equivalent,
B. wherein part of the chloride content is removed from aluminum chloride by passing its solution through an ion exchange resin membrane,
C. wherein active aluminum hydroxide is decomposed with hydrochloric or nitric acid,
D. wherein a concentrated aluminum salt solution is neutralized with an alkali,
E. wherein aluminum hydroxide is deposited by making an alkali aluminate and carbon dioxide or sulfur dioxide react with each other and is dissolved in hydrochloric acid,
F. wherein an aluminum-containing substance is decomposed with a mixed acid of hydrochloric acid and sulfuric acid and then the sulfuric acid ion is removed as an insoluble precipitate and,
G. wherein an alkali aluminate and an aluminum salt of a monobasic acid are made to react with each other.

On the other hand, there are known methods of introducing a sulfuric acid root into a basic aluminum salt solution:

a. wherein sulfuric acid or a water-soluble sulfate is added to a basic aluminum salt solution prepared by a known process and the solution is aged,
b. wherein an aluminum-containing substance is decomposed with a mixed acid of hydrochloric acid and sulfuric acid, then calcium carbonate is added to it and the excess sulfuric acid root is removed as gypsum
c. wherein a basic aluminum sulfate gel prepared by a known process is decomposed with hydrochloric acid or an aluminum chloride solution and
d. wherein concentrated hydrochloric acid, aluminum hydroxide and concentrated sulfuric acid are made to react with one another by using an autoclave.

As a result of making experiments on such various methods as are mentioned above, the present inventors have recognized that, in the method (a), the coagulation effect is not sufficient, that, in the method (b), a large amount of gypsum is by-produced and must be separated, in which case a portion of basic aluminum chloride is lost as deposited on the gypsum and causes a low yield, and the obtained product deposits gypsum by the temperature variation while it is stocked, that, in the method (c), it is necessary to produce a basic aluminum sulfate gel in advance, which is not economical, and that, in the method (d), the operation is complicated and is not industrial.

Therefore, as a method very economical and simple in the operation, the present inventors traced the method (a) wherein sulfuric acid or water-soluble sulfate was added to a basic aluminum chloride salt solution prepared by the above mentioned method (G) and the solution was aged. But it was known that the product was unstable and showed a lower coagulating effect than the basic aluminum salt solution containing sulfuric acid root prepared by the above mentioned method (b) or (c).

The cause of this phenomenon is not clear but is presumed to be related with the form of the co-ordination of a sulfuric acid ion with an $Al^{3+}$ ion or $OH^-$ or the polymerization degree of the $Al^{3+}$ ion.

As a result of further experiments on the basis of such various experiences as are mentioned above, the present inventors have completed the present invention by confirming that, when a sulfuric acid root is introduced before the production of an objective basic aluminum salt solution, there will be obtained a product far higher in the coagulating effect than a basic aluminum salt solution prepared by any of the above mentioned methods.

That is to say, the present invention relates to a process for preparing a stable solution of the basic aluminum salt represented by the general formula:

$$Al_m(OH)_n X_{3m-n-2k}(SO_4)_k$$

wherein X denotes $Cl^-$ or $NO_3^-$, $k$, $m$ and $n$ are respective positive indexes, $3m > n + 2k$, the basicity $((n/3m) \times 100)$ is 30 to 70% and $k/m = 0.01$ to $0.3$, characterized by mixing a water-soluble sulfate or a solution containing $SO_4$, a solution containing $Al^{+++}$ and $X^-$ and a sodium or potassium aluminate solution under a temperature condition below 40°C so that a gel may be produced and then keeping the entire mixture at 50° to 80°C so that the gel may be dissolved to give a basic aluminum salt solution.

The first object of the present invention is to provide a stable basic aluminum salt solution high in the coagulating force.

The second object of the present invention is to prepare a stable basic aluminum salt solution high in the coagulating force by a cheap and simple method.

Other objects of the present invention will become more definite from the following explanation.

The basic aluminum salt solution prepared by the process of the present invention is represented, as mentioned above, by the general formula:

$$Al_m(OH)_n X_{3m-n-2k}(SO_4)_k$$

wherein X is $Cl^-$ or $NO_3^-$, $k$, $m$ and $n$ are respective positive indexes, $3m > n + 2k$, the basicity $((n/3m) \times 100)$ is 30 to 70% and $k/m = 0.01$ to $0.3$.

Here the above general formula does not represent a structural formula. $Al_m(OH)_n X_{3m-n-2k}(SO_4)_k$ is a composition formula usually used for a general formula of a basic aluminum salt containing $SO_4$ (for example, Japanese Pat. Laid Open No. 20096/1972).

The basic aluminum salt is understood to be an inorganic complex which has some degree of polymerization and in which respective atoms are coupled in a complicate form.

First of all, in order to make it easy to understand the present invention, it is shown by using reaction formulas as follows:

$$11AlCl_3 + Al_2(SO_4)_3 + 5NaAlO_2 + NaOH + 10H_2O$$
$$Al_{18}(OH)_{21}Cl_{27}(SO_4)_3 + 6NaCl \quad (1)$$
$$13AlCl_3 + 3MgSO_4 + 5NaAlO_2 + NaOH + 10H_2O$$
$$Al_{18}(OH)_{21}Cl_{27}(SO_4)_3 + 3MgCl_2 + 6NaCl \quad (2)$$

That is to say, (1) is of the case that $SO_4^{--}$ is introduced as an aluminum salt and (2) shows the case that $SO_4^{--}$ is introduced as a magnesium salt.

Now, the process for preparing a stable basic aluminum salt solution according to the present invention shall be explained in detail.

The first operation of the present invention is to mix a water-soluble sulfate or solution containing $SO_4^{--}$, a solution containing $Al^{+++}$ and $X^-$ and an alkali aluminate solution under a temperature condition below 40°C so that a gel may be produced.

Embodiments of such method are:

1. a method wherein a solution containing $Al^{+++}$ and $X^-$ and an alkali aluminate solution are simultaneously or separately added to a water-soluble sulfate or a solution containing $SO_4^{--}$,
2. a method wherein a solution containing $Al^{+++}$, $X^-$ and $SO_4^{--}$ and an alkali aluminate solution are mixed together,
3. a method wherein a solution containing $Al^{+++}$ and $X^-$ and an alkali aluminate solution containing $SO_4$ are mixed together,
4. a method wherein a solution containing $Al^{+++}$, $X^-$ and $SO_4^{--}$ and an alkali aluminate solution containing $SO_4$ are mixed together and
5. a method wherein a solution containing $Al^{+++}$ and $X^-$ and an alkali aluminate solution are mixed together and then a water-soluble sulfate or a solution containing $SO_4$ is added to the mixed solution.

The water-soluble sulfate or the solution containing $SO_4$ in the above methods (1) to (5) means A. sulfuric acid or such soluble sulfate in solid or in solution as sodium sulfate, potassium sulfate, potassium alum, sodium alum, sodium bisulfate, potassium bisulfate, ammonium sulfate, ammonium bisulfate, ammonium alum, basic aluminum sulfate, aluminum sulfate, ferrous sulfate, ferric sulfate, magnesium sulfate, zinc sulfate. Particularly, in the present invention, aluminum sulfate and sodium sulfate solutions are preferable.

Further, the solution containing $Al^{+++}$ and $X^-$ in the above methods (1), (3) and (5) may be B. a solution of any one or more of aluminum chloride, basic aluminum chloride of a low basicity, aluminum nitrate and basic aluminum nitrate of a low basicity or a mixed solution of a water-soluble aluminum salt with such salt as, for example, a chloride or nitrate of sodium, potassium, magnesium or zinc or with hydrochloric acid or nitric acid.

The alkali aluminate solution in the above methods (1), (2) and (5) is

C. a solution of sodium aluminate or potassium aluminate. A mixed solution of them may be also used.

Now, the solution containing $Al^{+++}$, $X^-$ and $SO_4^{--}$ shall be explained. It may be a mixed solution of the solutions in (A) and (B) above or a solution prepared by decomposing bauxite, metallic aluminum or aluminum hydroxide with a mixed acid of hydrochloric acid and sulfuric acid or by dissolving aluminum chloride or aluminum nitrate with sulfuric acid or may be a solution prepared by any method. In short, it should contain $Al^{+++}$, $X^-$ and $SO_4^{--}$ at such rates and concentrations as are described later.

Further, the same can be said also on the alkali aluminate solution containing $SO_4^{--}$ in the above methods (3) and (4). For example, this solution can be prepared by adding one or more of sodium sulfate, potassium sulfate and ammonium sulfate to a sodium aluminate solution or by adding sodium hydroxide to a suspension of aluminum hydroxide in a sulfuric acid or aluminum sulfate solution and heating the solution so that the aluminum hydroxide may be dissolved.

Now, the concentration and composition of each solution shall be described. It is desirable to adjust the concentration and composition of each solution so that the concentration of the produced basic aluminum salt solution may be 5 to 15% by weight as of $Al_2O_3$, its basicity $((n/3m) \times 100)$ may be 30 to 70% and $k/m$ may be 0.01 to 0.3. Such adjustments can be easily made by one skilled in the art. For example, when the solution containing $Al^{+++}$ and $X^-$ is dilute, concentrated sodium aluminate or potassium aluminate may be used. Also, when the $SO_4^{--}$ is present in excess, the excess $SO_4$ may be precipitated and removed as barium sulfate or calcium sulfate by adding barium salt or calcium salt.

However, the concentration and composition of each solution should be decided as follows from the relation of the concentration and composition of the objective basic aluminum salt solution.

That is to say, the concentration of the solution containing Al and X should be made 5 to 15% by weight as of $Al_2O_3$ and its composition in terms of $Al^{+++}/X^-$ (gram equivalent ratio) 0.6 to 1.5. If these ranges are deviated from, it will be difficult to prepare a stable basic aluminum salt solution for the object of the present invention. However, if the concentration and composition are within these ranges, the solution will be stable and the coagulating effect will be high.

Further, in the case of using the solution containing $Al^{+++}$, $X^-$ and $SO_4^{--}$, and $Al_2O_3$ concentration should be made 5 to 15% by weight and its composition in terms of $$\frac{Al}{X + SO_4}$$

(gram equivalent ratio) should be 0.5 to 1.4. The reason is the same as above.

The solution containing an aluminic acid ion and alkali metal ion or containing an alumnic acid ion, alkali metal ion and sulfuric acid ion should contain 1 to 15% by weight of $Al_2O_3$ with a molar ratio of the alkali metal to aluminum of 1.1 to 2.0 and $SO_4$ concentration of 1 to 10% by weight. In these ranges, the solution is most stable and the gel produced by using it is easily soluble.

As evident from the above explanation, the $SO_4^{--}$ concentration and the amount of the solution containing a sulfuric acid ion in the above methods (1) and (5) should be such as would give a molar ratio of $$\frac{SO_4^{--}}{Al^{+++}}, \text{ or } \frac{K}{m},$$

of 0.01 to 0.3 in relating to aluminum contained in the product. Such concentration and amount can be easily determined by one skilled in the art.

Now, the reason why the $Al_2O_3$ concentration of the product is made 5 to 15% by weight is as follows:, if it is below the lower limit, the product will not be suited for transportation and will be too dilute to be used as a water coagulant. On the other hand, if the concentration is above the upper limit, the product will become unstable and will produce a precipitate. The optimum $Al_2O_3$ concentration as of a water treating coagulant is 8 to 12%. If the basicity is below 30%, the coagulating effect will be poor. If it is above 70%, the product will become very unstable and will produce a precipitate. In order to obtain the product highest in the coagulating effect, it is desirable to adjust the basicity to 45 to 60%. Also, in case $k/m$ is below 0.01, the coagulating effect will not be sufficient. When it is above 0.3, a stable solution will be produced temporarily but, while it is in stock, a precipitate will be produced gradually. The most desirable range as of a coagulant confirmed by the present inventors as a result of many experiments is $k/m = 0.1$ to 0.2.

The most important thing discovered by the present inventors is the temperature at which each solution is mixed. The present inventors have come to know through experiments that it should be mixed below 40°C. That is to say, if the mixing temperature is higher than 40°C., the produced gel will become so difficult to dissolve that, even if the gel is dissolved by taking a long time, the coagulating effect will be reduced very much.

The detailed facts are as follows:

EXPERIMENT 1

1365G of 35% hydrochloric acid, 163g of 75% sulfuric acid and a proper amount of water were added to 490g of a fine powder of aluminum hydroxide and the mixture was heated at 112°C for 2.5 hours to obtain 3090g of a solution of a composition:

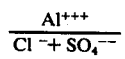

(gram equivalent ratio) = 1.20, a molar ratio of $SO_4^{--}$ / $Al^{+++}$ i.e. $k/m = 0.20$ and an $Al_2O_3$ concentration of 10.3% by weight. 200G of this solution were kept at each of the fixed temperatures in Table 1 and 77g of a sodium aluminate solution of a molar ratio of

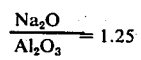

and an $Al_2O_3$ concentration of 10.3% by weight warmed to the same temperature were added to each of them during 10 minutes to produce a gel composed mostly of aluminum hydroxide. When this gel was heated to 80°C without being separated from the solution, the results were as follows:

Table 1

| Sample No. | Mixing temperature (°C) | Dissolved state of the gel |
|---|---|---|
| 1 | 15 | The gel completely dissolved in 5 minutes and the solution was transparent. |
| 2 | 40 | The gel completely dissolved in 15 minutes and the solution was transparent |
| 3 | 50 | The gel completely dissolved in 80 minutes and the solution was transparent. |
| 4 | 60 | The gel did not dissolve in 120 minutes and the solution was non-transparent. |
| 5 | 80 | The gel did not dissolve in 120 minutes and the solution was white- |

Table 1-continued

| Sample No. | Mixing temperature (°C) | Dissolved state of the gel |
|---|---|---|
| | | turbid. |

As evident from the above table, when the mixing temperature is high, the gel will be very difficult to dissolve. The reason is not clear but it is presumed that, when the temperature is high, a gel of a peculiar structure will be produced or the gel will be aged by heat to present the above mentioned phenomenon. On the other hand, when a gel produced above 40°C. is dissolved over a long time, the coagulating effect will be very low and the product will be often so unstable as to form an insoluble precipitate while in stock.

Now these facts are shown experimentally as follows:

EXPERIMENT 2

A water treating test by coagulation was made by using the basic aluminum salt solution of each of Sample Nos. 1 and 3 prepared in the Experiment 1.

PROCEDURE

1 Liter of the test water, which will be described later, was taken, an agent was poured into it, the water was agitated first quickly at 120 r.p.m. for 1.5 minutes, then slowly at 30 r.p.m. for 10 minutes and was left standing for 10 minutes. The supernatant liquid at about 2 cm below the level was taken and its turbidity and pH were measured. Meanwhile, the floc-formation time and the floc-size were measured during the agitation. The following standards were followed to indicate the floc-size.

| Standards | Sizes of flocs |
|---|---|
| Very large | Not less than 5mm. |
| Large | 3 to 5mm. |
| Medium | 2 to 3mm. |
| Small | About 1mm. |
| Very small | Not more than 0.5mm. |

TEST WATER 2G of refined kaolin were dispersed and suspended in 20 liters of tap water. This test water has a turbidity of 100 degrees and pH of 6.7.

Basic aluminum chloride solution of Sample No. 1 (All the percentages hereinafter are in weight unless otherwise indicated):

| | |
|---|---|
| $Al_2O_3$: | 10.3% |
| Cl: | 10.85% |
| $SO_4$: | 2.80% |
| Na: | 1.62% |
| Basicity: | 51.5% (in gram equivalent) |
| $\frac{K}{m}$ | 0.14 |

Basic aluminum chloride solution of Sample No. 3.

| | |
|---|---|
| $Al_2O_3$: | 10.3% |
| Cl: | 10.85% |
| $SO_4$: | 2.80% |
| Na: | 1.62% |
| Basicity: | 51.5% (in gram equivalent) |
| $\frac{K}{m}$ | 0.14 |

-continued

| m |
|---|

Table 2

| Sample No. | Dosage in Al$_2$O$_3$ (ppm) | Floc Formation-time (sec.) | Size | Supernatant pH | Turbidity |
|---|---|---|---|---|---|
| 1 | 3 | 60 | Large | 6.6 | 3 |
| 1 | 5 | 40 | Large | 6.5 | 1 |
| 3 | 3 | 360 | Very small | 6.6 | 23 |
| 3 | 5 | 24 | Small | 6.5 | 15 |

As evident from the above table, when a basic aluminum salt solution prepared by mixing above 50°C is used as a water treating coagulant, the coagulating effect is very low though the two solutions used has the same composition. It is presumably because the structure of the basic aluminum salt produced by the dissolution of the gel depends upon the temperature of gel formation. The particularly desirable gel-forming temperature is 5° to 30°C.

The next operation of the present invention is to dissolve the gel by heating it without separating it from the solution. The temperature to be adopted for heating is 50° to 80°C. Particularly at 60° to 70°C, a favorable result will be brought about in the coagulating effect. Below 50°C, the gel-dissolving time will be so long that it will not be industrial. On the other hand, when the gel is dissolved above 80°C, the coagulating effect will be very low and the product will be so unstable that a precipitate presumed to be aluminum hydroxide will be gradually produced.

The influence of gel-dissolving temperature upon the product stability will be further illustrated as follows:

EXPERIMENT 3

145G of an aluminum chloride solution (10.83%, Al$_2$O$_3$) were added to 55g of a solution containing sodium sulfate (13.50%, SO$_4$), the mixture was well agitated and then 68g of a sodium aluminate solution (molar ratio, $$\frac{Na_2O}{Al_2O_3} = 1.25;$$

Al$_2$O$_3$ = 12.50%) were added to it to produce a gel. The gel-forming temperature was 28°C. The solution containing this gel was heated to a fixed temperature to dissolve the gel. This solution was left standing at 25°C for 3 months and then the precipitate amount was investigated. The results were as follows:

Table 3

| Gel-dissolving temperature (°C) | Precipitate amount (%) |
|---|---|
| 50 | 0 |
| 60 | 0 |
| 70 | 0 |
| 80 | 0 |
| 90 | 0.24 |
| 100 | 0.36 |

That is to say, when the gel is dissolved in the temperature range of 50°–80°C., even if it is then kept for a long period of time, no precipitate will be produced and a stable basic aluminum salt solution will be prepared.

The basic aluminum salt solution of the present invention prepared by the above detailed operations shows a higher coagulating effect than a basic aluminum salt solution prepared by a known process.

This will be explained by the following experiment:

EXPERIMENT 4

Sample No. 1

54G of metallic aluminum were added to 550g of 20% HCl solution and the mixture was heated to 115°C to prepare a basic aluminum chloride solution of 19.8% Al$_2$O$_3$ and a gram equivalent ratio of Al$^{+++}$/Cl$^-$ = 2.01. Sodium sulfate and water were further added to it and the solution was aged at 60°C for 30 minutes to prepare a basic aluminum salt solution of a molar ratio of SO$_4^{--}$/Al$^{+++}$, or $k/m = 0.150$, basicity $((n/3m) \times 100) = 50.2\%$ and 10.2% Al$_2$O$_3$.

Sample No. 2

179G of aluminum hydroxide were added to 840g of mixed acid solution of 22.7% H$_2$SO$_4$ and 13.0% HCl, the mixture was heated to 110°C to dissolve the aluminum hydroxide, then a slurry of 165g of calcium carbonate and 250g of water was added to the solution and the produced precipitate of gypsum (CaSO$_4$ . 2H$_2$O) was separated and removed to prepare a basic aluminum chloride solution of a molar ratio of (SO$_4^{--}$/Al), or $(k/m) = 0.155$, basicity $((n/3m) \times 100) = 52.0\%$ and 10.3% Al$_2$O$_3$.

Sample No. 3

650G of a sodium aluminate solution of a molar ratio of $$\frac{Na_2O}{Al_2O_3} = 1.30$$

and 4.0% Al$_2$O$_3$ were added at the normal temperature to 465g of an aluminum sulfate solution containing 4.0% Al$_2$O$_3$ to produce a precipitate. The precipitate was separated and washed with water to obtain a basic aluminum sulfate gel containing 16.3% Al$_2$O$_3$, 8.4% SO$_4$ and 0.4% Na$_2$O. 100G of this gel were added to 170g of an aluminum chloride solutiton of 6.1% Al$_2$O$_3$, the mixture was warmed to 80°C to dissolve the gel and gave a basic aluminum chloride solution of a molar ratio of SO$_4^{--}$/Al$^{+++}$, or $k/m = 0.167$, basicity $((n/3m) \times 100) = 52.0\%$ and 10.2% Al$_2$O$_3$.

Sample No. 4

By the process of Experiment 1, various basic aluminum chloride solutions of the following compositions were prepared:

A$_1$ : Molar ratio, SO$_4^{--}$/Al$^{+++}$ (=$k/m$) = 0.149, basicity $((n/3m) \times 100) = 51.7\%$, Al$_2$O$_3$ 10.2%

A$_2$ : Molar ratio, SO$_4^{--}$/Al$^{+++}$ (=$k/m$) = 0.105, basicity $((n/3m) \times 100) = 64.0\%$, Al$_2$O$_3$ 10.3%

A$_3$ : Molar ratio, SO$_4^{--}$/Al$^{+++}$ (=$k/m$) = 0.102, basicity $((n/3m) \times 100) = 52.3\%$, Al$_2$O$_3$ 10.2%

A water treating test was made by using the basic aluminum chloride solution of each of the above mentioned Sample Nos. 1 to 4.

The test was carried out according to the process of Experiment 2 and using the same test water as in Example 2.

Table 4

| Sample No. | | Dosage in Al$_2$O$_3$ (ppm) | Floc Formation time (sec) | Floc Size | pH | Supernatant Turbidity |
|---|---|---|---|---|---|---|
| Control | 1 | 3 | 420 | Small | 6.6 | 23 |
| | | 5 | 300 | Very small | 6.5 | 18 |
| | 2 | 3 | 90 | Large | 6.6 | 5 |
| | | 5 | 60 | Large | 6.5 | 2 |
| | 3 | 3 | 60 | Large | 6.6 | 4 |
| | | 5 | 50 | Very large | 6.5 | 3 |
| Product of the present invention | 4-A$_1$ | 3 | 50 | Large | 6.6 | 1 |
| | | 5 | 30 | Very large | 6.5 | 0.2 |
| | 4-A$_2$ | 3 | 80 | Very large | 6.6 | 2 |
| | | 5 | 60 | Very large | 6.5 | 0.8 |
| | 4-A$_3$ | 3 | 40 | Large | 6.6 | 0.4 |
| | | 5 | 20 | Very large | 6.5 | 0.1 |

As is the above table, it is recognized that the coagulating effect of the basic aluminum salt solution obtained by the process of the present invention is evidently higher than of the product obtained by the known process.

That is to say, it is presumed that, when a basic aluminum salt solution is prepared by the process of the present invention, a polynuclear aluminum complex of a polymerization degree adapted to treating water and a stable structure will be formed in the processes of producing and dissolving the gel.

The basic aluminum salt solution prepared by the present invention can be used not only as a water treating coagulant but also as a size fixing agent in paper industry, refractory binder and surface treating agent for metals etc. just like other general basic aluminum salt solutions. The solution of the present invention can be dried into a powder.

Example 1:

300g of a mixed aqueous solution of aluminum chloride and aluminum sulfate (Al$_2$O$_3$ 10.6%; molar ratio, $$\frac{SO_4^{--}}{Al^{+++}} = \frac{k}{m} = 0.14;$$

liquid temperature 10.2°C) were taken into a 1L beaker, cooled in a water bath of 7°C and 180g of an aqueous solution of potassium aluminate (Al$_2$O$_3$ 8.73%; molar ratio, K$_2$O/Al$_2$O$_3$ = 1.41; liquid temperature 15.2°C) were added thereto over 15 minutes under agitation to give an aqueous solution in which a gel was dispersed.

Then this beaker was dipped in a hot water bath of 65°C to dissolved the gel under agitation. After 1 hour, the solution was filtered with filter paper to give 478g of a basic aluminum salt solution.

Analysis: Al$_2$O$_3$ 9.94%, SO$_4$ 1.72%, K$_2$O 4.27%, Cl 12.60%, Basicity 48.6%.

EXAMPLE 2

740G of an aqueous solution of aluminum nitrate of a low basicity (Al$_2$O$_3$ 6.20%, molar ratio Al$^{+++}$/NO$_3^-$ = 0.38) were put into a mixer. To this were added 185g of an aqueous solution of sodium aluminate (Al$_2$O$_3$ 10.90%; molar ratio, $$\frac{Na_2O}{Al_2O_3} = 1.25)$$

over 12 minutes under agitation. And then 75g of an aqueous solution of aluminum sulfate (Al$_2$O$_3$ 7.4%) were added thereto. The temperature of the mixed solution at this time was 32°C. The total amount of this solution containing a gel was put into a 2L flask and the gel was completely dissolved at 60°C during 35 minutes to give 1000g of a basic aluminum nitrate solution.

Analysis: Al$_2$O$_3$ 7.16%, SO$_4$ 1.57%, Na$_2$O 1.53%, NO$_3$ 14.67%, Basicity 47.8%.

EXAMPLE 3

620G of 35% hydrochloric acid, 64g of 75% sulfuric acid and water were added to 190g of a fine powder of bauxite (Al$_2$O$_3$ 68.38%, Fe$_2$O$_3$ 1.85%) and the mixture was heated to be decomposed at 110°C for 3 hours and was filtered to give 1048g of a solution (gram equivalent ratio, $$\frac{Al^{+++}}{Cl^- + SO_4^{--} - Fe} = 1.09;$$

molar ratio, SO$_4^{--}$/Al$^{+++}$, or k/m = 0.21; Al$_2$O$_3$ 11.50%).

294G of this solution were taken into a 1L beaker, cooled in a water bath of 20°C. To this were added over 10 minutes 230g of a sodium aluminate solution (molar ratio, $$\frac{Na_2O}{Al_2O_3} = 1.37;$$

Al$_2$O$_3$ 10.50%) obtained by adding 350g of sodium hydroxide and water to 500g of a fine powder of bauxite, decomposing the mixture by heating it for 1.5 hours and filtering it, to give a solution at 35°C in which a gel was dispersed.

Then this beaker was put into a hot water bath of 60°C and the gel was dissolved under agitation to give 520g of a basic aluminum salt solution.

Analysis: Al$_2$O$_3$ 11.15%, Cl 10.74%, SO$_4$ 2.53%, Na$_2$O 3.87%, Fe$_2$O$_3$ 0.16%, Basicity 64.9%.

EXAMPLE 4

400G of a basic aluminum chloride solution ($Al_2O_3$ 12.5%, gram equivalent ratio, $Al^{+++}/Cl^- = 1.35$) were put into a mixer. To this solution were added over 15 minutes under agitation a mixed solution of 330g of a sodium aluminate solution ($Al_2O_3$ 8.50%; Molar ratio, $$\frac{Na_2O}{l_2O_3} = 1.25)$$

and 70g of an ammonium sulfate solution ($SO_4$ 29.09%.). The temperature of the mixed solution at this time was 35°C.

This mixed solution containing a gel was transferred into a 1L flask and, when the gel was kept at 60°C, it completely dissolved in about 0.5 hour to give 800g of a basic aluminum salt solution.

Analysis: $Al_2O_3$ 9.76%, Cl 9.66%, $SO_4$ 2.55%, $Na_2O$ 2.66%, N 0.74%, Basicity 67.4%.

EXAMPLE 5

300G of a mixed solution of an aluminum chloride solution and ferric sulfate solution ($Al_2O_3$ 9.80%; $Fe_2O_3$ 1.25%; Cl 20.44%; $SO_4$ 2.25%) were taken into a 1L beaker. To this were added over 15 minutes 180g of a sodium aluminate solution ($Al_2O_3$ 10.50%; $Na_2O$ 9.32%; $SO_4$ 2.07%) obtained by adding sulfuric acid, sodium hydroxide and water to a fine powder of aluminum hydroxide. The temperature of the mixed solution at this time was 32°C.

Then this beaker was dipped into a hot water bath of 60°C and the gel was dissolved under agitation for about 1 hour to give 478g of a basic aluminum salt solution.

Analysis: $Al_2O_3$ 10.10%, $Fe_2O_3$ 0.78%, Cl 12.83%, $SO_4$ 2.19%, $Na_2O$ 3.51%, Basicity 55.4%.

EXAMPLE 6

200G of a magnesium sulfate solution (MgO 3.53%) were taken into a 1L beaker, cooled in water bath of 18°C. To this were added, over 15 minutes under agitation, simultaneously 400g of a basic aluminum chloride solution ($Al_2O_3$ 10.35%; chemical equivalent ratio, $Al^{+++}/Cl^- = 1.12$) and 150g of a sodium aluminate solution ($Al_2O_3$ 10.5%; Molar ratio, $$\frac{Na_2O}{Al_2O_3} = 1.2)$$

to give an aqueous solution (at 32°C) in which a gel was dispersed.

Then this beaker was dipped into a hot water bath of 65°C and the gel was dissolved for 40 minutes under agitation to give 745 g of a clear basic aluminum salt solution.

Analysis: $Al_2O_3$ 7.67%, Cl 10.35%, $SO_4$ 2.26%, $Na_2O$ 1.54%, MgO 0.95%, Basicity 46.3%.

EXAMPLE 7

500G of an aluminum nitrate solution ($Al_2O_3$ 6.50%) were taken into a 1L beaker, which was put in a water bath of 15°C. To this were added over 10 minutes under agitation 95g of a sodium alum solution ($SO_4$ 11.41%) and then 140g of a sodium aluminate solution ($Al_2O_3$ 15.30%; Molar ratio, $$\frac{Na_2O}{Al_2O_3} = 1.25)$$

to give an aqueous solution at 28°C containing a gel. The gel was dissolved under agitation with the beaker kept in a hot water bath of 65°C to give 732g of a basic aluminum salt solution.

Analysis: $Al_2O_3$ 7.76%, $NO_3$ 16.20%, $SO_4$ 1.48%, $Na_2O$ 2.46%, Basicity 53.4%.

EXAMPLE 8

232G of a zinc sulfate solution (ZnO 6.16%) were used in place of the magnesium sulfate solution in the process of Example 6 to prepare 782g of a basic aluminum salt solution.

Analysis: $Al_2O_3$ 7.31%, Cl 9.86%, $SO_4$ 2.15%, $Na_2O$ 1.47%, ZnO 1.83%, Basicity 46.3%.

EXAMPLE 9

184G of a potassium sulfate solution ($K_2O$ 8.96%) were used in place of the magnesium sulfate solution in the process of Example 6 to prepare 734g of a basic aluminum salt solution.

Analysis: $Al_2O_3$ 7.79%, Cl 10.50%, $SO_4$ 2.29%, $Na_2O$ 1.57%, $K_2O$ 2.25%, Basicity 46.3%.

EXAMPLE 10

85G of a basic aluminum sulfate solution (Chemical equivalent ratio, $$\frac{Al}{SO_4} = 1.27;$$

$Al_2O_3$ 7.50%) were added in place of the aluminum sulfate solution in the process of Example 2 to prepare 1010g of a basic aluminum salt solution.

Analysis: $Al_2O_3$ 7.17%, $NO_3$ 14.53%, $SO_4$ 1.40%, $Na_2O$ 1.52%, Basicity 49.1%.

EXAMPLE 11

19G of a powder of sodium hydrogen sulfate were used in place of the aluminum sulfate solution in the process of Example 2 to prepare 944g of a basic aluminum solution.

Analysis: $Al_2O_3$ 7.00%, $NO_3$ 15.54%, $SO_4$ 1.61% $Na_2O$ 2.14%, Basicity 45.3%.

EXAMPLE 12

586G of 35% hydrochloric acid, 32g of an ammonium alum powder were added with some water to 60g of an aluminum powder and the mixture was heated for reaction at 110°C for 4 hours to give 1040g solution (gram equivalent ratio, $$\frac{Al^{+++}}{Cl^- + SO_4^{++} - NH_4^+} = 1.18;$$

Molar ratio, $SO_4^-/Al^{+++}$, or $k/m = 0.06$; $Al_2O_3$ 11.24%).

The whole quantity of this solution was placed in a 2L flask and cooled in a water bath of 20°C. To this were added, over 15 minutes under agitation, 350g of a sodium aluminate solution (Molar ratio, $$\frac{Na_2O}{Al_2O_3} = 1.20;$$

$Al_2O_3$ 8.56%). A solution containing a gel in dispersion was obtained (32°C).

Then with the flask placed in a 70°C water bath the gel was dissolved under agitation to give 1390g of a basic aluminum salt solution.

Analysis: $Al_2O_3$ 10.57%, Cl 14.32%, $SO_4$ 0.98%, N 0.07%, $Na_2O$ 1.57%, Basicity 40.7%.

What is claimed is:

1. A process for preparing a solution of the basic aluminum salt represented by the formula:

$$Al_m(OH)_nX_{3m-n-2k}(SO_4)_k$$

wherein X denotes $Cl^-$ or $NO_3^-$, $k$, $m$ and $n$ are respective positive indices, $3m > n + 2k$, the basicity $((n/3m) \times 100)$ is 30 to 70% and $k/m = 0.01$ to 0.3, which solution is stable against precipitation, characterized by mixing a water-soluble sulfate or a solution containing $SO_4^{--}$, a solution containing $Al^{+++}$ and $X^-$ and a sodium or potassium aluminate solution at a temperature below 40°C to form a gel and then keeping the entire mixture at 50° to 80°C so that said gel is dissolved to give a basic aluminum salt solution.

2. A process for preparing a stable solution of the basic aluminum salt represented by the formula $$Al_m(OH)_nX_{3m-n-2k}(SO_4)_k$$

wherein X denotes $C^-$ or $NO_3^-$, $k$, $m$ and $n$ are respective positive indices, $3m > n + 2k$, the basicity $((n/3m) \times 100)$ is 30 to 70% and $k/m = 0.01$ to 0.3, which solution is stable against precipitation, characterized by mixing a solution containing $Al^{+++}$, $X^-$ and $SO_4^{--}$ and a sodium or potassium aluminate solution at a temperature below 40°C to form a gel and then keeping the entire mixture at 50° to 80°C so that said gel is dissolved to give a basic aluminum salt solution.

3. A process for preparing a stable solution of the basic aluminum salt according to claim 2 wherein the $Al_2O_3$ concentration of said solution containing $Al^{+++}$, $X^-$ and $SO_4^{--}$ is 5 to 15% by weight.

4. A process for preparing a stable solution of the basic aluminum salt according to claim 3 wherein the gram equivalent ratio, $$\frac{Al^{+++}}{X^- + SO_4^{--}}$$

of said solution containing $Al^{+++}$, $X^-$ and $SO_4^{--}$ is 0.5 to 1.4.

5. A process for preparing a stable solution of the basic aluminum salt according to claim 2 wherein the gram equivalent ratio, $$\frac{Al^{+++}}{X^- + SO_4^{--}}$$

of said solution containing $Al^{+++}$, $X^-$ and $SO_4^{--}$ is 0.5 to 1.4.

6. A process for preparing a stable solution of the basic aluminum salt according to claim 2 wherein the molar ratio of the sodium or potassium to aluminum of said sodium or potassium aluminate solution is 1.1 to 2.0 and its $Al_2O_3$ concentration is 1 to 15% by weight.

7. A process for preparing a stable solution of the basic aluminum salt represented by the formula $$Al_m(OH)_nX_{3m-n-2k}(SO_4)_k$$

wherein X denotes $Cl^-$ or $NO_3^-$, $k$, $m$ and $n$ are respective positive indices, $3m > n + 2k$, the basicity $((n/3m) \times 100)$ is 30 to 70% and $k/m = 0.01$ to 0.3, which solution is stable against precipitation, characterized by mixing a solution containing $Al^{+++}$ and $X^-$ and a sodium or potassium aluminate solution containing $SO_4^{--}$ at a temperature below 40°C to form a gel and then keeping the entire mixture at 50° to 80°C so that said geel is dissolved to give a basic aluminum salt solution.

8. A process for preparing a stable solution of the basic aluminum salt according to claim 7 wherein the $Al_2O_3$ concentration of said solution containing $Al^{+++}$ and $X^-$ is 5 to 15% by weight.

9. A process for preparing a stable solution of the basic aluminum salt according to claim 5 wherein the chemical equivalent ratio, $$\frac{Al^{+++}}{X^-}$$

of said solution containing $Al^{+++}$ and $X^-$ is 0.6 to 1.5.

10. A process for preparing a stable solution of the basic aluminum salt according to claim 7 wherein the gram equivalent ratio, $$\frac{Al^{+++}}{X^-}$$

of said solution containing $Al^{+++}$ and $X^-$ is 0.6 to 1.5.

11. A process for preparing a stable solution of the basic aluminum salt according to claim 7 wherein the molar ratio of the sodium or potassium to aluminum of said sodium or potassium aluminate solution containing $SO_4^{--}$ is 1.1 to 2.0, its $Al_2O_3$ concentration is 1 to 15% by weight and its $SO_4^{--}$ concentration is 1 to 10% by weight.

* * * * *